United States Patent [19]

Helmrich et al.

[11] 4,105,729

[45] * Aug. 8, 1978

[54] METHOD OF MAKING SHAPED BODIES

[75] Inventors: Gunter Helmrich, Grevenbroich; Fritz Wülfing, Rheydt, both of Fed. Rep. of Germany

[73] Assignee: Vereinigte Aluminium-Werke Aktiengesellschaft, Bonn, Fed. Rep. of Germany

[ * ] Notice: The portion of the term of this patent subsequent to Mar. 14, 1995, has been disclaimed.

[21] Appl. No.: 167,126

[22] Filed: Jul. 29, 1971

Related U.S. Application Data

[62] Division of Ser. No. 854,184, Aug. 29, 1969, abandoned.

[51] Int. Cl.[2] .......... B28B 1/04; B29G 1/00

[52] U.S. Cl. .......... 264/71; 264/120

[58] Field of Search .......... 264/69, 71, 72, 120

[56] References Cited

U.S. PATENT DOCUMENTS

| | | | |
|---|---|---|---|
| 831,296 | 9/1906 | Purvis | 264/69 |
| 1,884,528 | 10/1932 | Benner et al. | 264/72 |
| 1,937,028 | 11/1933 | Lux et al. | 264/72 |
| 2,311,358 | 2/1943 | Baily | 264/71 |
| 2,507,302 | 5/1950 | Hedström | 264/69 |
| 2,667,679 | 2/1954 | Jackman | 264/69 |
| 3,042,594 | 7/1962 | Hauth | 29/420 |
| 3,470,279 | 9/1969 | Abbott | 264/72 |

OTHER PUBLICATIONS

Anon., Vibratory Compacting of Metal and Ceramic Powders, U.S. Dept. of Commerce, pp. 11-14.

*Primary Examiner*—Willard E. Hoag
*Attorney, Agent, or Firm*—Darby & Darby

[57] ABSTRACT

A method and an apparatus for producing coherent shaped bodies from granular material. The granular material is confined in a mold and the mold is subjected to vibratory motions requisite for compacting the granular material. In accordance with the invention, the granular material is vibrated at its resonant frequency under a light load, then a substantial compressive force is applied to the granular material and the granular material is vibrated at the resonant frequency of the whole vibrating system under compression.

1 Claim, 4 Drawing Figures

METHOD OF MAKING SHAPED BODIES

CROSS REFERENCE TO RELATED APPLICATIONS

This application is a division of application Ser. No. 854,184, filed Aug. 29, 1969, now abandoned.

BACKGROUND OF THE INVENTION

The present invention relates generally to the shaping or compacting of granular masses, and more particularly to a method of producing coherent bodies from granular masses by subjecting the same to vibratory stresses requisite to compacting the granular masses into a coherent body.

There are many applications where it is necessary to compact granular materials into a coherent body of predetermined shape, the body being required to have certain characteristics, namely homogeneity and uniform density. It is possible in this manner to produce rather large bodies.

The materials which are compacted are of sand-like consistency and of viscous flowable character; they do not, however, have a plastic character. Such materials are for instance discussed in U.S. Pat. No. 3,526,686 (Weinhold).

To produce coherent shaped bodies from such granular materials or masses it is already known to confine a quantity of the granular mass in a mold which is supported in a vibratory platform, and to vibrate the platform and thereby the mold to the extent requisite for obtaining the compaction necessary to transform the granular mass to a coherent body. The mold has an open top and a weight member is introduced through this open top and rests on the granular mass accommodated in the mold so as to provide pressure upon the granular mass while the same is subjected to vibration. The vibration may be transmitted by rotating imbalanced masses.

SUMMARY OF THE INVENTION

It is a general object of the present invention to further improve the method known from the prior art for producing coherent bodies by compacting granular masses through subjecting them to vibratory stresses.

More particularly it is an object of the present invention to provide an improved method of the type under discussion which will result in the production of shaped coherent bodies having a greater density and better homogeneity than was heretofore possible.

In pursuance of the above objects, and others which will become apparent hereafter, one feature of our invention resides in a method of producing coherent bodies by confining granular material in a mold and subjecting the same to vibrations requisite for compacting the granular material into a coherent body. The improvement according to our present invention resides in continuously varying the frequency of the vibration of the mold for thereby influencing the compacting of the granular material in a sense which results in the production of coherent bodies having improved density and homogeneity.

The frequency of vibration is so adjusted in accordance with the present invention that on the one hand it is accommodated to the weight of the body which is being produced from the confined granular mass, and on the other hand is accommodated to the resonance characteristics of the granular mass which varies as the granular mass becomes compacted and transformed into a coherent body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
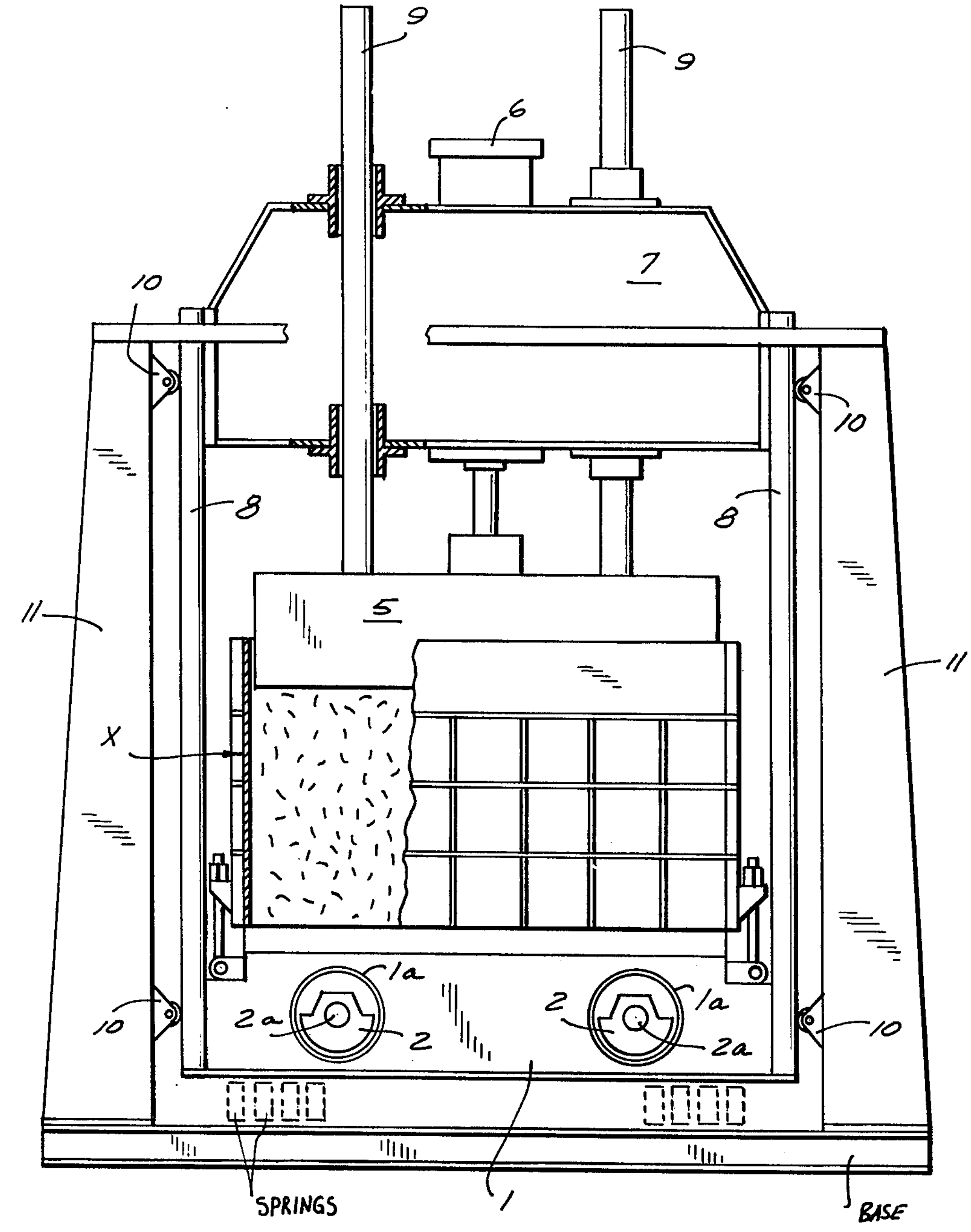
FIG. 1 is a somewhat diagrammatic front elevation of an apparatus for the carrying out of the method of the present invention.
Figure 2:
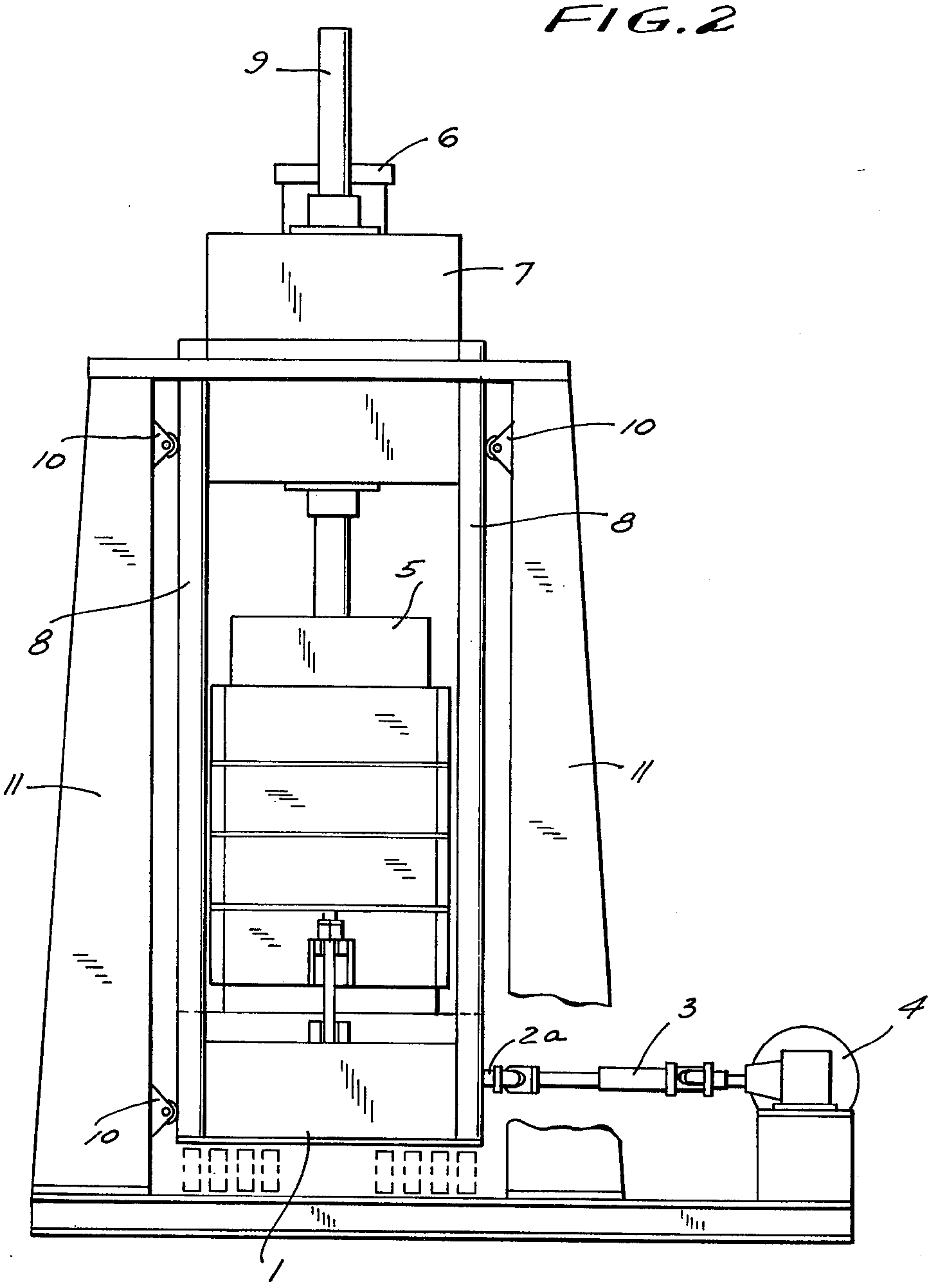
FIG. 2 is a side elevation of FIG. 1.

Discussing the drawing in detail, and firstly FIGS. 1 and 2 thereof, it will be seen that reference numeral 1 identifies a vibratory platform which is supported in "floating" condition via the diagrammatically illustrated springs on a base which is identified by legend. The configuration of the platform is evident from a comparison of FIGS. 1 and 2, and it will also be seen that mounted in the platform 1 are imbalanced masses in form of rotary bodies 2 which are located in the cavities *1a* of the platform 1 and are rotatable about their respective shafts *2a*. The vibratory masses 2 will normally be rotated in mutually opposite directions. It is evident that because they are imbalanced they will impart vibratory stresses to the vibratory platform 1.

Rotary motion is transmitted to the shafts *2a* by coupling the same via the articulated shafts 3—which are clearly shown in FIG. 2 and which are conventional so that they require no detailed discussion—with a continuously variable drive, so as to permit continuous variation in the number of rotations of the shafts 3 and thereby the shafts *2a*. The drive may either be a conventional well-known variable motor or, as illustrated, a hydrostatic drive 4 which is also known per se to those skilled in the art and therefore not discussed in detail. Essential in connection with the drive 4 is only that it be continuously variable to permit continuous variation in the rotations of the shafts 3 and accordingly the shafts *2a*.

A weight in form of a plate 5 is so configurated as to be receivable through the open top of the mold—which latter is identified with a legend in FIG. 1, as is the material to be compacted contained in the interior of the mold—and rests on the granular mass located in the mold. It serves the dual purpose of weighing the material and of assuring that the upper surface of the finally produced coherent body will be smooth in accordance with the smooth underside of the plate 5. It is to be noted that the plate 5 is freely received in the open top of the mold.

Located above the mold is a traverse 7 which is connected via the tie rods 8 with the vibratory platform 1 and supports a cylinder and piston arrangement 6. The cylinder and piston arrangement 6 is associated with the plate 5 and able to impart stresses thereto in a sense pressing it deeper into the mold, thereby serving to compress the granular mass contained therein. It operates preferably either with compressed air or on an oil-hydraulic basis. Details concerning these features need not be discussed because they are well known to those skilled in the art and the construction of the arrangement 6 does not in itself form a part of the present invention.

The plate 5 is guided in order to prevent it from tilting with respect to the mold. To assure that this guidance is always reliable, that is that the plate 5 will not be able to tilt or cant, it is connected with guide rods 9 which are slidably supported in the traverse 7 as illustrated in FIG. 1, and which are so rigid as to resist bending.

At opposite sides of the vibratory platform 1 there are provided upright supports 11 mounted on the illustrated base, and it will be understood that these supports 11 are entirely rigid. The supports 11 are provided with guide rollers 10 (compare FIGS. 1 and 2) which engage the remainder of the apparatus in suitable manner, hereby engaging the members 8, in order to maintain the apparatus in predetermined relationship with respect to the uprights 8. This contributes to a quieter operation.

Figure 3:
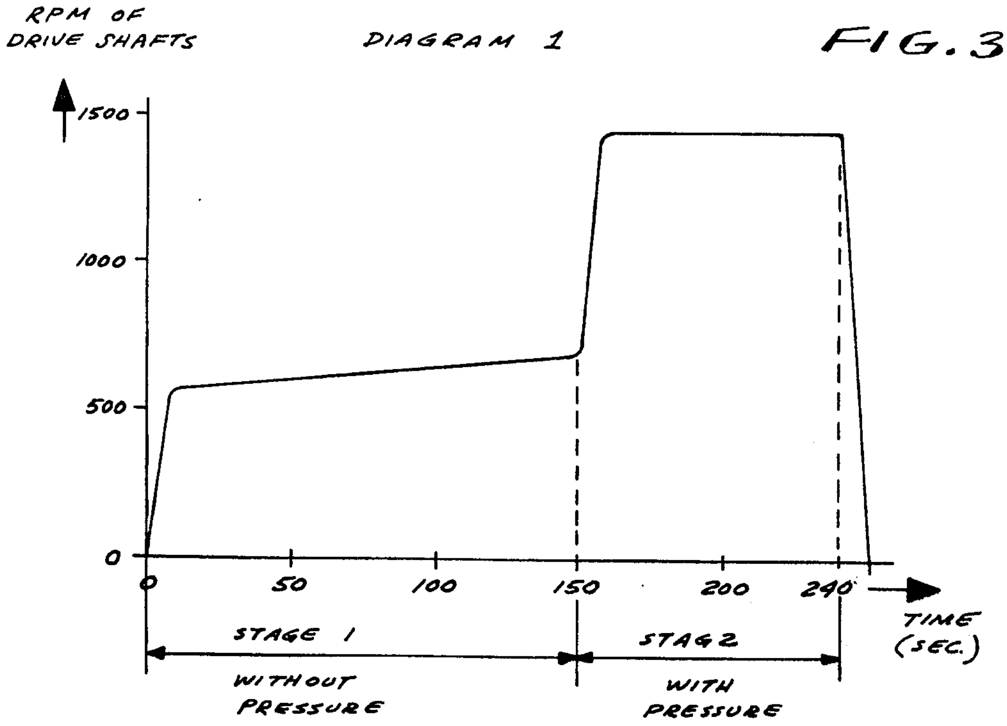
FIG. 3 and FIG. 4 are diagrams illustrating graphically the operation of the invention on hand of the exemplary production of a coherent body from a quantity of granular mass.
Figure 4:
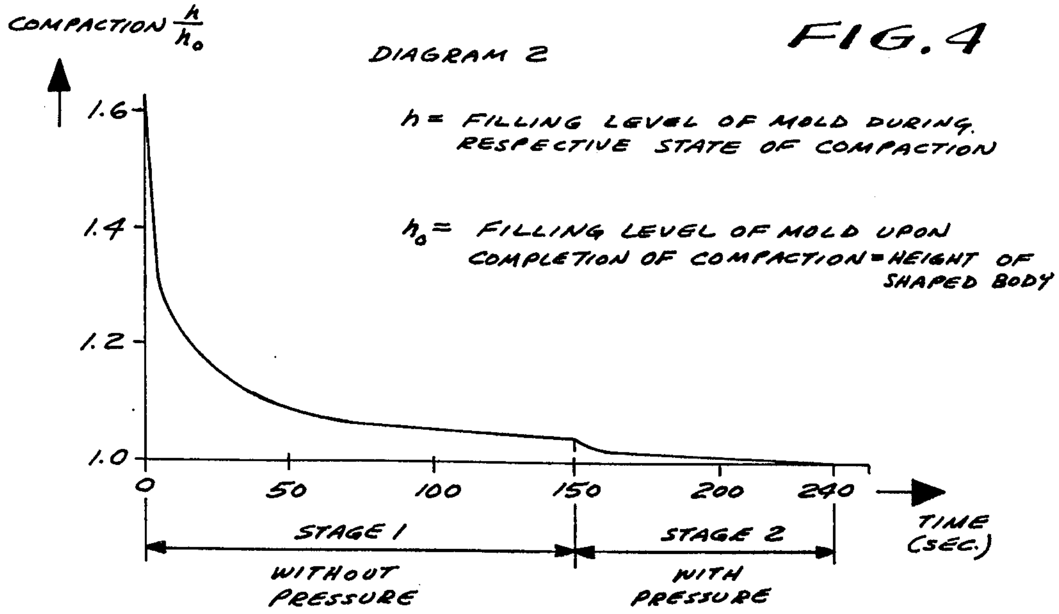

FIGS. 3 and 4 are diagrams illustrating the operation of the apparatus in the exemplary production of a body having a weight of approximately 1 ton from a granular mass. The mold is filled with the requisite quantity of granular mass at a location remote from the apparatus and is introduced to the position which it assumes in FIGS. 1 and 2 by being moved in the direction of the arrow X (see FIG. 1). How this is done is immaterial for the purposes of the invention.

Now the cover plate 5 is made to descend until it rests freely on the granular mass contained in the mold. Thereupon, the drive 4 is started, imparting rotary motion via the shafts 2a to the imbalanced masses 2. The number of revolutions per minute for the imbalanced masses 2 is selected via the drive 4 in accordance with stage 1 of diagram 1 which is shown in FIG. 3. It is emphasized that the curve shown in FIG. 3 has been experimentally determined in accordance with the resonance characteristics of the system involved. Operated in this manner, the apparatus produces a compaction of the granular mass which is in accordance with the curve shown in stage 1 of the diagram 2 shown in FIG. 4. This is obtained without any pressure upon the granular mass other than that exerted by the weight of the plate 5. It will be seen that compaction under these circumstances approaches a border value after approximately 150 seconds.

At this time, and in order to further improve density and homogeneity of the body which is to be produced by compacting of the granular mass, the cylinder and piston arrangement 6 of FIG. 1 is now operated and exerts in the illustrative example of FIGS. 3 and 4 a pressure of approximately 25 tons onto the plate 5. At the same time the rotations of the imbalanced masses 2 are increased in accordance with stage 2 in the diagram 1 of FIG. 3. The result of this is shown in stage 2 in the diagram 2 of FIG. 4, from which it will be evident that additional compaction is obtained with a maximum value being reached after approximately 240 seconds, counting from the start-up of the apparatus.

It will be understood that each of the elements described above, or two or more together, may also find a useful application in other types of applications differing from the types described above.

While the invention has been illustrated and described as embodied in the production of coherent bodies by vibratory compacting of granular masses, it is not intended to be limited to the details shown, since various modifications and structural changes may be made without departing in any way from the spirit of the present invention.

What is claimed as new and desired to be protected by Letters Patent is set forth in the appended claims:

1. In a method of producing coherent bodies from coherable granular material, the steps comprising: providing a vibratory compacting device including a mold mounted for vibratory movement; confining a mass of granular material in said mold; resting a cover weight freely on top of said granular material; vibrating said mold at a first frequency while said cover weight rests freely on said granular material until partial compacting of said granular material is effected, said first frequency being accommodated to the resonance characteristics of said granular material; thereafter applying a substantial force to said cover weight to brace it against said partially compacted granular material; and vibrating said mold at a second frequency substantially higher than said first frequency while said cover plate is braced against said granular material, said second higher frequency being at least a multiple of said first frequency and being a function of the resonance characteristics of the vibrating system with said cover weight braced against said granular mass.

* * * * *